United States Patent
Chipman et al.

(10) Patent No.: US 8,684,454 B2
(45) Date of Patent: Apr. 1, 2014

(54) INFANT CAR SEAT

(76) Inventors: Robert Chipman, Newton, NH (US);
Kevin Keenaghan, Pawtucket, RI (US)

( * ) Notice: Subject to any disclaimer, the term of this patent is extended or adjusted under 35 U.S.C. 154(b) by 434 days.

(21) Appl. No.: 13/090,914

(22) Filed: Apr. 20, 2011

(65) Prior Publication Data
US 2012/0267924 A1  Oct. 25, 2012

(51) Int. Cl.
*A47C 31/00* (2006.01)

(52) U.S. Cl.
USPC .............................................. 297/183.2

(58) Field of Classification Search
USPC ............................................ 297/183.1, 183.2
See application file for complete search history.

(56) References Cited

U.S. PATENT DOCUMENTS

| | | |
|---|---|---|
| 2,664,140 A | 12/1953 | Kindelsberger |
| 3,171,687 A | 3/1965 | Jensen |
| 3,206,247 A | 9/1965 | Johnson |
| 3,290,092 A | 12/1966 | Howard |
| 3,948,556 A | 4/1976 | Hyde et al. |
| 3,992,056 A | 11/1976 | Koziatek et al. |
| 4,033,622 A | 7/1977 | Boudreau |
| 4,274,674 A | 6/1981 | Deloustal |
| 4,343,510 A | 8/1982 | Cone |
| 4,371,206 A | 2/1983 | Johnson |
| 4,429,916 A | 2/1984 | Hyde et al. |
| 4,610,448 A | 9/1986 | Hill |
| 4,634,175 A | 1/1987 | Wise |
| 4,688,850 A | 8/1987 | Brownlie et al. |
| 4,982,997 A * | 1/1991 | Knoedler et al. ...... 297/183.2 X |
| 5,143,419 A | 9/1992 | Tepper et al. |
| 5,207,476 A | 5/1993 | Payne |
| 5,324,094 A | 6/1994 | Kain |
| 5,409,292 A | 4/1995 | Kain et al. |
| 5,516,190 A | 5/1996 | Kain et al. |
| 5,544,935 A | 8/1996 | Cone |
| 5,651,581 A | 7/1997 | Myers et al. |
| 5,658,044 A | 8/1997 | Krevh |
| 5,961,180 A | 10/1999 | Greger et al. |
| 5,971,476 A | 10/1999 | Gibson et al. |
| 5,997,086 A | 12/1999 | Gibson et al. |
| 6,017,088 A | 1/2000 | Stephens et al. |
| 6,070,890 A | 6/2000 | Haut et al. |
| 6,139,101 A | 10/2000 | Berringer et al. |
| 6,318,799 B1 | 11/2001 | Greger et al. |
| 6,331,032 B1 | 12/2001 | Haut et al. |
| 6,561,577 B2 | 5/2003 | Kelly |
| 6,811,216 B2 | 11/2004 | Sedlack |
| 6,834,915 B2 | 12/2004 | Sedlack |
| 6,913,313 B2 | 7/2005 | Sedlack |
| 6,979,057 B2 | 12/2005 | Sedlack |
| D545,074 S | 6/2007 | Loew et al. |
| 7,325,871 B2 | 2/2008 | Gangadharan et al. |
| 7,472,955 B2 | 1/2009 | Crane et al. |
| 7,677,408 B2 | 3/2010 | Loucks et al. |

* cited by examiner

*Primary Examiner* — Anthony D Barfield
(74) *Attorney, Agent, or Firm* — Lambert & Associates; Gary E. Lambert; David J. Connaughton, Jr.

(57) ABSTRACT

An infant car seat including a seat shell that forms a seat capable of receiving and retaining an infant, a hip contour defined by the seat shell, and a lifting handle rotatably attached to a connection point on the seat shell. A method of carrying the infant car seat by one carrier. A method of carrying the infant car seat by two carriers.

18 Claims, 5 Drawing Sheets

INFANT CAR SEAT

GOVERNMENT LICENSE

The U.S. Government has reserved a nonexclusive, irrevocable, royalty-free license in the invention with power to grant licenses for all governmental purposes.

BACKGROUND OF THE INVENTION

1. Field of the Invention

The present invention relates generally to infant carrying devices. More particularly, the present invention relates to an ergonomic infant car seat.

2. Description of Related Art

Infant car seats serve three primary functions. First, they are commonly used as a safe method to transport infants and small children in a vehicle. Secondly, they are used to provide a convenient and safe method to manually transport the infant or small child from one point to another, including the transit between a residence and car. Thirdly, they hold the infant or small child in a comfortable manner while the vehicle is being driven or while the seat is being transported.

A traditional infant car seat is typically comprised of a plastic seat shell having a seat back for supporting the infant, a rotatable U-shaped lifting handle that extends laterally across the seat for lifting and carrying the seat, a safety harness system and padding for the comfort of the child.

The infant car seats currently on the market have been designed to be extremely comfortable and safe for the infant. However, they cannot be comfortably carried by an adult. The position of the rotatable lifting handle forces the carrier's arm to extend outward awkwardly, and the seat often falls against the carrier's leg in an uncomfortable manner when carrying the seat. Other alternative methods of carrying the seat (e.g. with the rotatable lifting handle held in the crook of the carrier's elbow) are also unnatural. In addition, both of these may be a contributing factor to bad posture.

Although some changes have been made to the rotatable lifting handle design, none have significantly improved the problem of discomfort while carrying such a seat.

Other changes have incorporated padded sections on the seat shell or alternative carrying handles, but none have gone far enough to allow for a comfortable or healthy way to carry the seat. The padded sections are only a superficial solution, and the fixed position of the alternative carrying handles drastically limits the potential benefits of such a solution.

Therefore, what is needed is an infant car seat that does not cause discomfort to the carrier, and simultaneously provides comfort and safety to an infant in the car seat.

SUMMARY OF THE INVENTION

The subject matter of this application may involve, in some cases, interrelated products, alternative solutions to a particular problem, and/or a plurality of different uses of a single system or article.

In one aspect, an infant car seat is provided. This car seat comprises a seat shell that forms a seat capable of receiving and retaining an infant, a hip contour defined by the seat shell, and a lifting handle rotatably attached to a connection point on the seat shell.

In another aspect, a method of carrying an infant car seat having a hip contour along an outer surface of a seat shell is provided. The method comprises the steps of securing an infant in the infant car seat, lifting the infant car seat by at least on of a plurality of handles, placing a hip contour of a first side of the infant car seat against a human hip, and grasping at least one of the plurality of handles, the handle being located on a second side of the infant car seat opposite to the hip contour on the first side of the infant car seat.

In yet another aspect, a method of carrying an infant car seat having a plurality of rotatable side handles is provided. The method comprises the steps of securing an infant in an infant car seat having a first and second rotatable carrying handle, grasping the first rotatable carrying handle by a first carrier, grasping the second rotatable carrying handle by a second carrier, and lifting the infant car seat.

DETAILED DESCRIPTION

Figure 1:
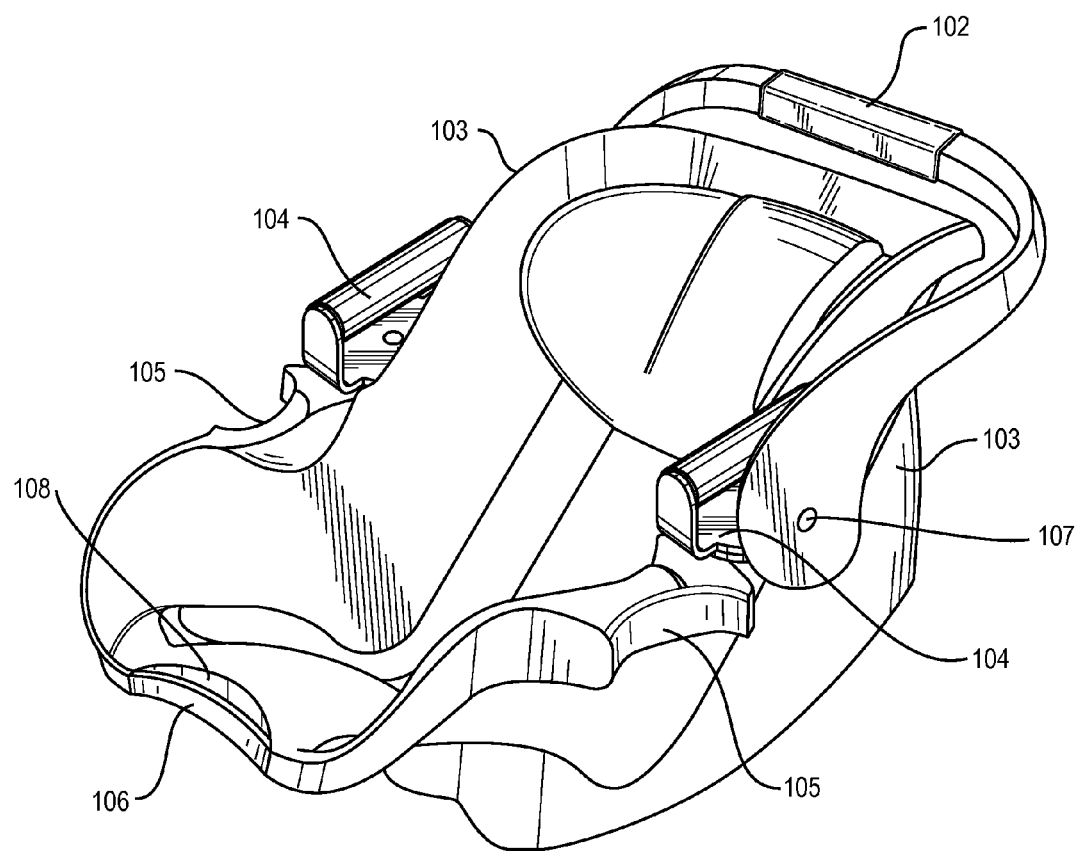
FIG. 1 provides a perspective view of one embodiment of the infant car seat.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

It was against the above noted background that a novel approach to solving the problem of discomfort when carrying the infant car seat was realized. Generally, the present invention provides for an infant car seat with side carrying handles that can be rotated about their axes in either discrete increments or in a sweeping manner to alter the manner in which the seat can be carried according to the carrier or carriers' preference. In addition, this novel approach allows two individuals to easily and comfortably carry the infant car seat, with their respective handles rotated according to their individual preferences. Further, the present invention also provides for a side hip contour, allowing for additional comfort and safety when carrying the seat in one of many carrying modes. Optionally, an additional hip contour and handle at the foot of the seat increases the number of potential carrying modes. Finally, although the present invention is shown as an infant car seat, the fundamentals of the present invention are equally applicable to any similar device used to carry or transport infants.

In one aspect, the present invention provides for an infant car seat. The infant car seat has a seat shell that provides structure for the infant car seat. This seat shell is constructed and arranged to provide a seat for an infant to be safely and comfortably retained, and a base constructed to allow the infant car seat to be placed securely on a surface. The shell may be constructed to receive seat padding to aid in comforting the infant. The shell may also define one or more hip contours, and may define connection points for a lifting handle, and at least one side carrying handles.

The seat shell may be of any size and shape that may receive and safely retain an infant, that is also capable of being carried by an adult. Preferably, the seat shell is constructed to have a head-portion where the infants' head is intended to be located, and a foot-portion where the infant's feet are intended to be located.

The seat shell may be constructed of any rigid material capable of receiving and safely retaining an infant. Materials of which the seat shell can be made include, but are not limited to, metals, high strength plastics, composite materials or wood. In one embodiment, the seat shell is made of injection molded plastic.

The seat shell may be constructed to define a hip contour. The hip contour is constructed and arranged to provide a comfortable carrying experience for a carrier, and also to allow the infant car seat to be carried in a variety of ways. The hip contour may be of any size and shape to comfortably accommodate the contours of a human waist. Preferably, this will involve the hip contour being shaped as a slight to substantial inward curving that forms a concave depression relative to the seat shell. This concave depression preferably will be capable of receiving and accommodating the convex shape of a human hip. However, it should be understood that hip contours could be shaped differently and still be within the scope of the present invention, so long as the contour is constructed to substantially accommodate the contours of a human hip.

In one embodiment this hip contour is centrally located along a length of the seat shell. In another embodiment, the hip contour is located on a foot-portion of the seat shell. In yet another embodiment, a plurality of hip contours are defined by the seat shell and located along a length of the seat shell on both a left and right side of the seat shell and also along a foot-portion of the seat shell. It should be understood that the hip contour may be located in any position along an outer surface of the seat shell.

In another embodiment, the hip contour may be removable. The removable hip contour may be a separate structural element that extends from the seat shell and is attached thereto. In this embodiment, the hip contour may be attached or detached from the seat shell depending on mode of use, and how the infant car seat is being carried. In this embodiment, the removable hip contour may be constructed of any material rigid and resilient enough to substantially retain its shape when being held against a human hip. Materials of which the hip contour can be made include, but are not limited to, metals, high strength plastics, composite materials or wood. In one embodiment, the hip contour is made of injection molded plastic.

In another embodiment, the hip contour of the seat shell may be constructed to form an aperture between the hip contour and the seat shell. This aperture preferably is sized to be large enough for a human hand to pass through and grasp the hip contour, thereby utilizing the hip contour as an additional handle. This embodiment may be particularly applicable to a hip contour positioned on a foot-portion of the seat shell because it may increase the number of carrying options of the infant car seat.

In the above noted embodiment, the hip contour may be constructed of any material rigid and resilient enough to retain its shape when being held against a human hip and also when being used as a handle to carry the infant car seat. Materials of which the hip contour can be made include, but are not limited to, metals, high strength plastics, composite materials or wood. In one embodiment, the hip contour is made of injection molded plastic.

In one embodiment, an outer surface of the hip contour further comprises a quantity of padding. This padding may be constructed of any suitable padding material that provides cushioning between the hip contour and a hip of the body of the carrier. In one embodiment, the padding is constructed of polyurethane foam. In another embodiment, the padding is constructed of a cotton fabric pad. In another embodiment, the padding is soft rubber. Attachment the padding to the hip contour may be achieved by adhesive, stitching, Velcro®, or the like.

In a further embodiment, the infant car seat may include a safety device. The safety device is intended to prevent the accidental release of the infant car seat when the seat is placed against a human hip. The safety device may be of any structure that allows connection between the infant car seat and a portion of the carrier's body or garments. One embodiment of a safety device may be a strap that wraps around a users waist and connects to the infant car seat. Another embodiment may be a strap that can be secured over a shoulder of a carrier and connected to the infant car seat. Still another embodiment may be a hook or clip attached directly to the seat shell that can rest on or be attached to a carrier's clothing or belt. This clip may also be connected to the seat shell by a length of strap disposed between the clip and the seat shell.

The seat shell may further define at least one connection point for the connection of a lifting handle. Preferably, there are two connection points defined by the seat shell for connection to the lifting handle. As known in the art, the lifting handle may be substantially U shaped, with each terminal end being connected to a connection point defined by the seat shell. Preferably, the connection points are located on opposite sides of the infant car seat along each lengthwise edge of the seat shell. This structure allows the lifting handle to extend laterally across the seat shell. In one embodiment, the connection point allows rotatable connection of the lifting handle. The lifting handle is designed to be one of many modes of lifting and carrying the infant car seat, and may be constructed to be rotatable about the seat shell.

The lifting handle may be constructed of any rigid material capable of supporting and retaining the seat shell while being lifted and carried with an infant secured in the infant car seat. Materials of which the lifting handle can be made include, but are not limited to, metals, high strength plastics, composite material, or wood. In one embodiment, the lifting handle is made of injection molded plastic.

The seat shell may additionally define a connection point for connecting a side carrying handle. The connection point is constructed and arranged to receive the side carrying handle. Preferably, the connection point for the side carrying handle is upward-facing, thereby allowing the side carrying handles to be grasped from above. Such structure would be desirable for an adult carrying the infant car seat, for example. The side carrying handles may be axially rotatable about the vertical axis formed when connecting the carrying handle to the connection point. In one embodiment, two carrying handles are contemplated, each handle being located on an opposite side of the infant car seat along each lengthwise edge of the seat shell.

In one embodiment, the side carrying handles may be incrementally rotatable. This incremental rotation allows a plurality of distinct rotation positions such that the side carrying handle may be secured in a rotation position until action is taken to rotate the side carrying handle to another rotation position. This movement may be achieved by any structure capable of allowing incremental rotation. By way of example, an embodiment of this structure involves a switch that is constructed and arranged to prevent rotation in a first switch position and to allow rotation in a second switch position. This switch may have a locking tab that fits between a plurality of different slots. When the locking tab is engaged with one of the plurality of slots, it will prevent the side carrying handle from rotation. When the locking tab is disengaged from the slots, it will allow rotation of the side carrying handle.

In one embodiment, the surface of the carrying handle may be rubberized. In another embodiment, the surface of the carrying handle may be padded. The carrying handle may be of any size such that it is capable of receiving a human hand and such that it is capable of being rigid and resilient enough to retain and support the infant car seat when being carried.

The invention thus described offers a wide variety of ergonomic carrying options. In one carrying embodiment, the infant car seat is carried by positioning the hip contour against a hip of the carrier. The carrier then reaches his hip-side arm across the infant car seat and grasps the side carrying handle, thereby carrying the seat by one handle and a frictional connection between the hip contour of the seat shell and the hip. In a further embodiment, a safety device may be secured between the user and the infant car seat as a protection against accidental dropping.

In another carrying embodiment, the infant car seat is carried by the carrier grasping two of the side carrying handles, one with each hand, and resting the foot-portion hip contour against his waist or stomach.

In another carrying embodiment, the infant car seat may be carried by positioning the lifting handle towards a rear portion of the seat shell, and holding it with one hand, while holding the handle formed by the foot-portion hip contour.

In another carrying embodiment, the infant car seat may be carried by two carriers. The first carrier grasping a first side carrying handle, and the second carrier grasping a second side carrying handle. This allows two carriers to walk side by side and comfortably both carry the infant car seat.

Turning now to FIG. 1 a perspective view of one embodiment of the infant car seat is shown. A seat shell 103 provides the base structure for the infant car seat and is constructed and arranged to receive and retain an infant safely and comfortably. The seat shell 103 has a lifting handle 102 attached at a connection point 107. In the embodiment shown, the lifting handle 102 is connected at two connection points. A first connection point 107, and a second connection point (not shown), the connection points are located on opposite sides of the seat shell 103. This lifting handle 102 is rotatable about the connection points to allow for various lifting or carrying modes.

Figure 2:
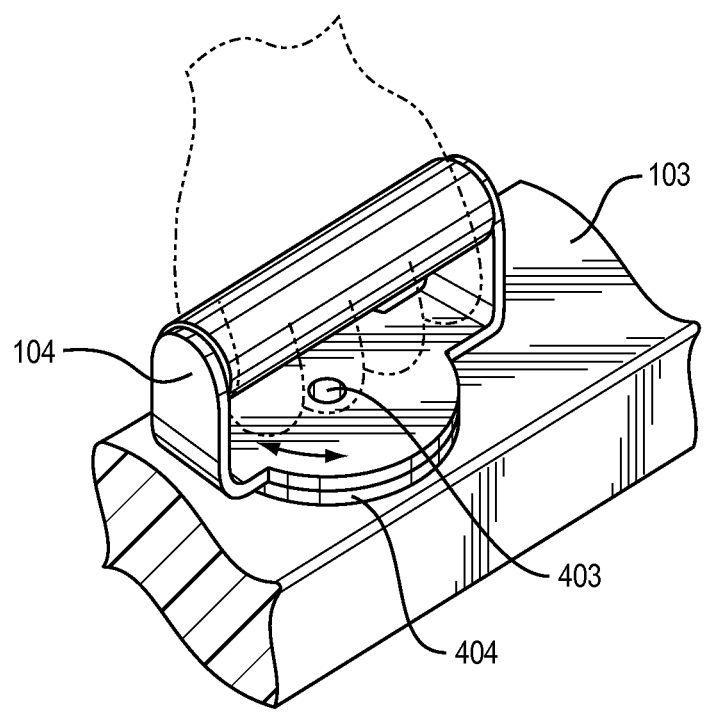
FIG. 2 provides a detail view of one embodiment of the side carrying handle.
Figure 3:
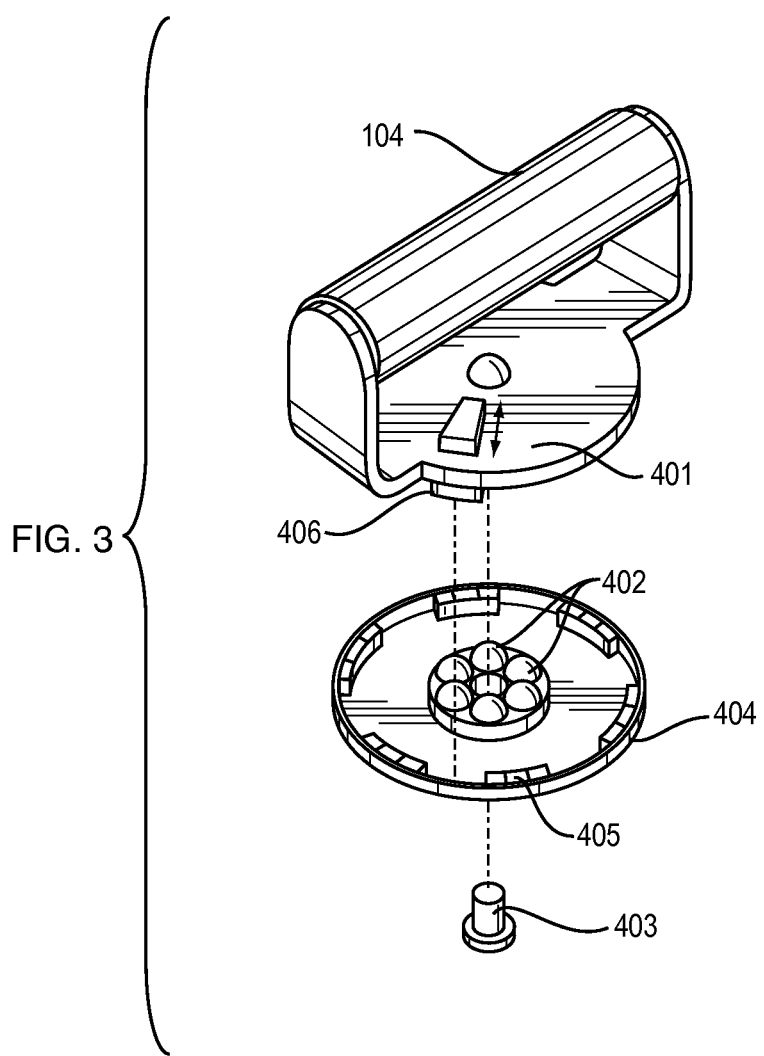
FIG. 3 provides an exploded view of one embodiment of a side carrying handle.

The seat shell 103 has two side carrying handles 104 attached at side carrying handle connection points, which can be further seen in FIGS. 2 and 3. The side carrying handle 104 is constructed and arranged to allow the infant car seat to be carried by these handles. The side carrying handles 104 are positioned along the seat shell 103 on opposite sides of the infant car seat along each lengthwise edge of the seat shell 103. The side carrying handle 104 is upward facing, allowing it to be grasped from above.

The seat shell 103 defines two side hip contours 105. These hip contours 105 are centrally located along each length wise edge of the seat shell 103, and are positioned opposite one another. The hip contours 105 are constructed and arranged to receive a contour of a human hip, and as such, are shaped as substantially concave regions.

The seat shell 103 further defines a foot-portion hip contour 106. The foot-portion hip contour 106 is positioned to be at a foot-portion of the seat shell 103. The foot-portion hip contour 106 is shaped as a substantially concave region along a surface of the seat shell 103.

The seat shell 103 defines an aperture 108 bounded by the seat shell 103 and the foot portion hip contour 106. This aperture 108 thus formed is constructed and arranged to allow a human hand to fit through and grasp the foot-portion hip contour 106, thereby allowing the foot-portion hip contour 106 to act as an additional handle.

FIG. 2 shows a detail view of one embodiment of the side carrying handle 104. The side carrying handle 104 is connected to the seat shell 103 by a pin 403 that runs through the seat shell 103, a lower portion 404 of the side carrying handle, and the side carrying handle 104.

FIG. 3 shows an exploded view of one embodiment of a side carrying handle 104. In this embodiment, the rotatable structure of the carrying handle 104 is shown. This carrying handle 104 includes a switch 401 that is constructed and arranged to prevent rotation in a first switch position and to allow rotation in a second switch position. The switch operates by moving a locking tab 406 from a locked position, which prevents rotation of the carrying handle 104, to an unlocked position, which allows rotation of the carrying handle 104. This rotation is about an axis formed by the pin 403 which holds the various elements of the carrying handle 104 together. The switch 401 may be constructed in any manner that allows movement of the locking tab 406 from a locked to unlocked position.

The carrying handle 104 has a lower portion 404 containing ball bearings 402 that aid in the rotation of the carrying handle 104. The lower portion 404 further contains a plurality of slots 405 that are constructed and arranged to receive the locking tab 406 in a locked position, thereby preventing rotation of the carrying handle 104. In one embodiment, the lower portion 404 and pin 403 may be integrated into the seat shell 103. In another embodiment, the lower portion 404 could be a separate element that attaches to a pin 403 which may extend from the seat shell 103. In still another embodiment, both the pin 403 and the lower portion 404 may be separate elements from the seat shell 103.

Figure 4:
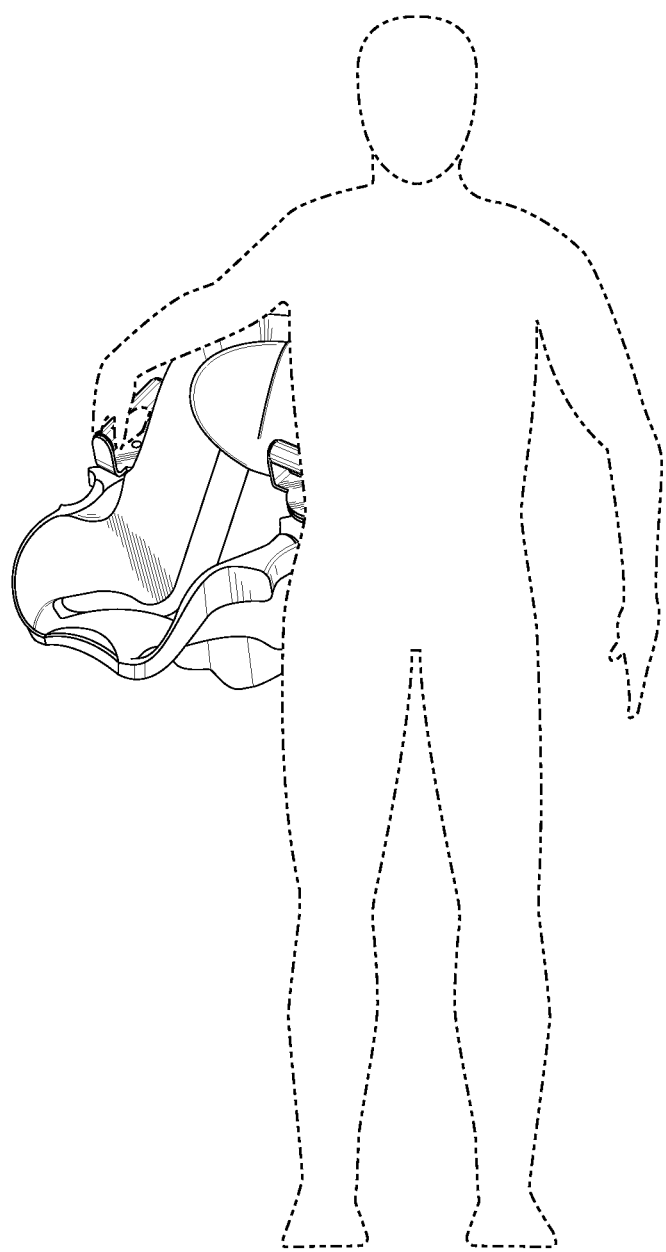
FIG. 4 provides a method of carrying an infant car seat having a hip contour along an outer surface of a seat shell.

FIG. 4 shows a method of carrying an infant car seat having a hip contour along an outer surface of a seat shell. The method comprises the steps of securing an infant in an infant car seat having a hip contour along an outer surface of a seat shell, lifting the infant car seat by at least one of a plurality of handles of the infant car seat, placing the hip contour of a first side of the infant car seat against a human hip, and using a human hand to grasp a second side of the infant car, the second side being opposite to the first side of the infant car seat, and maintaining pressure between the human hip and the hip contour such that the infant car seat is secured.

In another embodiment, the method may contain the further step of securing a safety device to a carrier of the infant car seat. This safety device may be attached to the infant car seat at one end, and attached to any part of the carrier at its second end. This safety device may include a strap that connects the infant car seat to a belt buckle of the carrier, to the carrier's clothing, or around the carriers waist or shoulder, among others.

Figure 5:
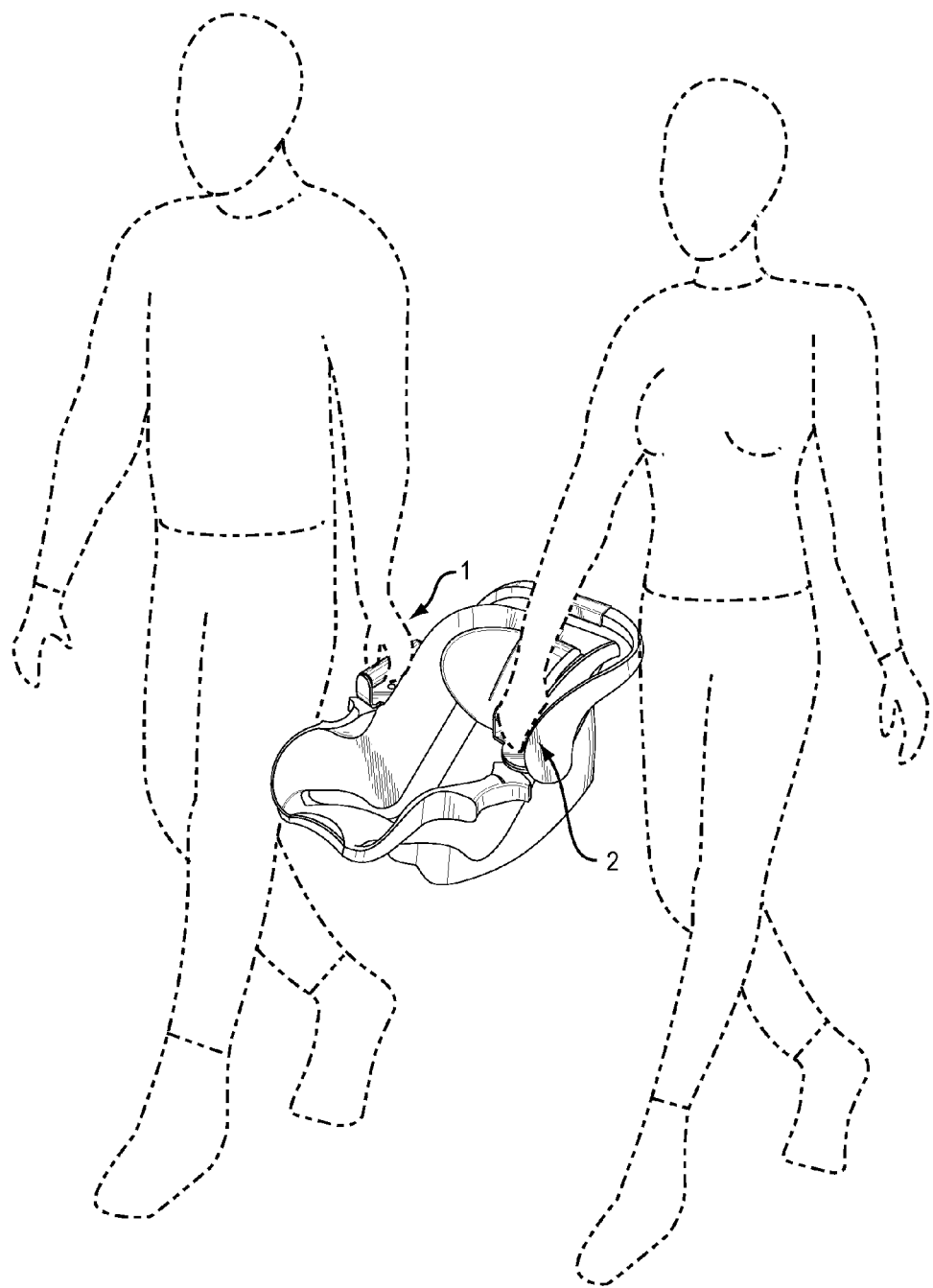
FIG. 5 provides a method of carrying an infant car seat having rotatable side handles.

FIG. 5 shows a method of carrying an infant car seat having rotatable side handles. The method comprises the steps of securing an infant in an infant car seat having at least two side carrying handles, using the two side carrying handles to lift the infant car seat. In this embodiment, a first side carrying handle 1 is held by a first carrier, and a second side carrying handle 2 is held by a second carrier. The side carrying handles are shown in different rotational positions, the first side carrying handle being parallel with a length of the car seat; the second side carrying handle being perpendicular with a length of the car seat. This embodiment allows for two carriers to carry the infant car seat comfortably.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. An infant car seat comprising:
   a seat shell forming a seat capable of receiving and retaining an infant;
   a lifting handle rotatably attached to a connection point on the seat shell;
   two rotatable side carrying handles, each rotatable side carrying handle being connected to the seat shell on opposite upper lengthwise edges of the seat shell, each side carrying handle being rotatable about a vertical axis, and sized to allow a hand of a user to grasp under and around the handle.

2. The infant car seat of claim 1 further comprising a a hip contour defined by the seat shell.

3. The infant car seat of claim 2 wherein the hip contour forms a substantially concave portion constructed and arranged to receive a human hip.

4. The infant car seat of claim 2 wherein the hip contour further comprises a quantity of padding.

5. The infant car seat of claim 2 wherein the hip contour is capable of detachment from the seat shell.

6. The infant car seat of claim 2 wherein the side carrying handle is incrementally rotatable.

7. The infant car seat of claim 6 wherein the side carrying handle further comprises a switch that prevents rotation of the side carrying handle in a first switch position, and allows rotation of the side carrying handle in a second switch position.

8. The infant car seat of claim 1 wherein the seat shell further defines a foot-portion hip contour, positioned on the seat shell in a location substantially near where a foot of the infant is intended to rest.

9. The infant car seat of claim 8 wherein the foot-portion hip contour further comprises a quantity of padding.

10. The infant car seat of claim 8 wherein the seat shell further defines an aperture between the foot-portion hip contour and the seat shell.

11. The infant car seat of claim 1 further comprising a safety device secured to the seat shell at a first end, and constructed and arranged to connect to a carrier of the infant car seat at a second end.

12. The infant car seat of claim 11 wherein the safety device first end is a strap and the safety device second end is a clip.

13. The infant car seat of claim 11 wherein the safety device is a clip, with a clip first end directly connected to the infant car seat shell.

14. The infant car seat of claim 11 wherein a length of the safety device is retractable within an aperture of the seat shell.

15. The infant car seat of claim 1 wherein:
   the first side carrying handle being connected to the seat shell by a vertically oriented first connection pin that runs through an aperture formed by the seat shell and an aperture formed by the first side carrying handle; and
   the second side carrying handle being connected to the seat shell by a vertically oriented second connection pin that runs through a second aperture formed by the seat shell and an aperture formed by the second side carrying handle.

16. A method of carrying an infant car seat having a hip contour along an outer surface of a seat shell comprising the steps of:
   securing an infant in the infant car seat;
   lifting the infant car seat by at least one of a plurality of handles rotatable about a vertical axis connected to the infant car seat;
   placing a hip contour of a first side of the infant car seat against a human hip; and
   grasping at least one of the plurality of handles, the at least one of the plurality of handles being located on a second side of the infant car seat opposite to the hip contour on the first side of the infant car seat.

17. The method of carrying an infant car seat having a hip contour along an outer surface of a seat shell of claim 16 further comprising the step of securing a safety device.

18. A method of carrying the infant car seat of claim 1 having a plurality of rotatable side handles comprising the steps of:
   securing an infant in an infant car seat having a first rotatable side carrying handle and a second rotatable side carrying handle each side carrying handle being rotatable about a vertical axis;
   grasping the first side rotatable carrying handle by a first carrier;
   grasping the second rotatable carrying handle by a second carrier; and
   lifting the infant car seat.

* * * * *